No. 860,930. PATENTED JULY 23, 1907.
E. MERTEN.
APPARATUS FOR SEPARATING AND PURIFYING SEWAGE AND THE LIKE.
APPLICATION FILED MAY 15, 1907.
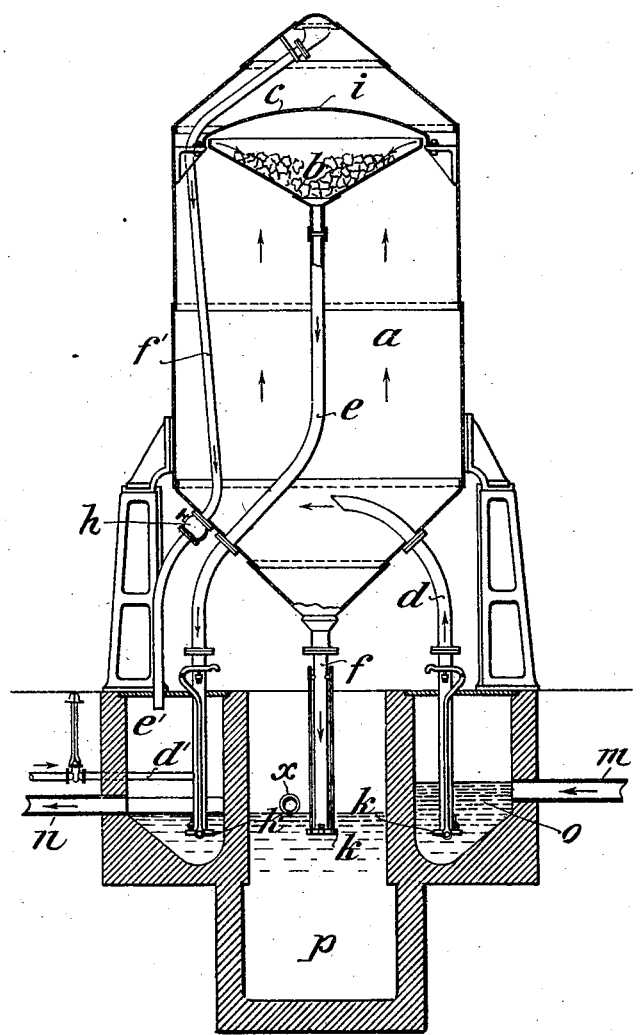

UNITED STATES PATENT OFFICE.

ERICH MERTEN, OF BERLIN, GERMANY.

APPARATUS FOR SEPARATING AND PURIFYING SEWAGE AND THE LIKE.

No. 860,930. Specification of Letters Patent. Patented July 23, 1907.

Application filed May 15, 1907. Serial No. 373,801.

*To all whom it may concern:*

Be it known that I, ERICH MERTEN, engineer, a subject of the German Emperor, residing at Berlin, 95 Königgrätzerstrasse, Germany, have invented certain new and useful Improvements in Apparatus for Separating and Purifying Sewage and the Like; and I do hereby declare the following to be a full, clear, and exact description of the invention, such as will enable others skilled in the art to which it appertains to make and use the same.

The invention relates to apparatus for separating the liquid from the solid constituents of sewage and belongs to the general class of apparatus in which the liquid constituents are carried off by siphonic action while the sludge or solid matter subsides and is delivered into a receiving pit or chamber therefor, likewise by siphonic action.

In apparatus of this general character, in which the separation of the solid and liquid matter is effected by siphonic action, it is highly essential to prevent the admission of air into the separating tank which will have the effect of breaking the siphon and the less air that is permitted to enter the tank, the longer the operation of the apparatus may be continued without special attention, and conversely the efficiency of the apparatus falls as the vacuum in the tank decreases, and if this takes place rapidly, the vacuum has to be repeatedly renewed, and during these periods of renewal the entire apparatus is out of commission.

The object of this invention is to prevent, as far as possible, air bubbles from the atmosphere penetrating into and rising in the tank or separator, so that the period of operation of the apparatus may be materially lengthened. The object in question is attained, according to this invention, by providing the tank with a combined air and grease discharge pipe arranged within the separating chamber and having its opening above the funnel of the water discharge pipe, which latter is conveniently provided with a suitable cap which constitutes an effective strainer to prevent any solid matters which may rise in the tank passing into the discharge pipe. As the combined grease and air discharge pipe connects the atmosphere with the space above the funnel, any air which may find its way into the tank will be discharged and the possibility of air entering the tank is materially reduced.

A convenient form of apparatus for carrying out this invention is illustrated in the accompanying drawings, in which the apparatus is shown in vertical section.

Referring to the drawings, $a$ indicates an air tight tank, preferably provided with conical upper and lower ends, and in said tank there is a centrally located discharge pipe $e$ from which the water or other liquid constituents of the sewage is discharged from the upper portion of the tank into a liquid discharge chamber $e'$, and this pipe $e$ is provided for the purpose with a funnel $b$ at its end, which funnel is provided with a covering plate $c$, in the center of which are several air holes $i$. The covering plate coöperates with the edge of the funnel in such manner that only a narrow peripheral slot is left through which the water from the tank can pass into the funnel $b$ and the pipe $e$. Owing to the overlapping edge of the covering plate, floating substances, which have passed into the upper portion of the tank, are prevented from being carried downward through the pipe $e$, the narrow slot serving as an effective strainer.

Opening near the top of the tank $a$ and preferably just under the apex of the conical upper end, is a pipe $f'$ which passes downward through said tank and discharges into the upper portion of said discharge chamber $e$. The said pipe $f$ is conveniently provided with a valve $h$, for a purpose to be hereinafter referred to.

The bottom of the tank $a$ is provided with a discharge pipe $f$ which connects the tank with a discharge pit or chamber. The sewage or other material to be separated is admitted to the tank $a$ by a pipe $d$, the lower end of which dips into a sewage receiving pit or chamber $o$, into which a supply pipe $m$ enters.

The discharge chamber $e'$ which receives the separated liquid is provided with an overflow pipe $n$ which opens into said chamber $e'$ at a lower level than that at which the supply pipe $m$ enters the sewage receiving chamber $o$, so that the level of the liquid in the chamber $e'$ is lower than that in chamber $o$ and once a flow of liquid has been established through the chamber $a$, it will be continued by siphonic action through the pipe $d$, chamber $a$, and pipe $e$, until the siphon is broken by the entrance of air in sufficient quantities to unseal the mouth of the funnel $b$.

Preparatory to starting the apparatus, it is necessary that the tank $a$ be filled with water and that all of the air be expelled from said tank. To effect this, the pipe $h$ in valve $e'$ is opened and a supply of water admitted to the tank $a$ through pipe $e$ by way of the water supply pipe $d'$, which preferably connects with pipe $e$ inside the chamber $e'$. In order to cause the water to pass upward through pipe $e$ into the tank, said pipe $e$ is provided with a simple cup valve $k$ at its end which may be suitably packed with leather and is opened or closed by means of a suitable rod provided with a handle extending above the cover of the chamber $e'$. The sludge discharge pipe $f$ and the intake pipe $d$ are similarly provided with cup valves $k$ by means of which the siphon pipes, both intake and discharge may be closed at will. Owing to the fact that the water for initially filling the tank $a$ passes by way of pipe $d$ through the relatively warm discharge chamber $e'$, the danger of the apparatus freezing in cold weather is avoided.

The operation of the apparatus is substantially as follows. The sewage pit $o$ is filled to the level of pipe

*m*. The tank *a* is completely filled with water from water supply pipe *d'* by way of pipe *e*, the water entering the chamber through said pipe and forcing the air out of the discharge pipe *f'*. After the chamber *a* has been completely filled with water and all the air therein expelled, the valves *k* covering the lower ends of the siphon pipes are opened, valve *h* in air pipe *f'* having been closed, siphonic action is immediately set up and the liquid constituents in the tank pass into the funnel *b*, through the narrow peripheral slit between the funnel and its cover, through the discharge pipe *e* into chamber *e'* from which it flows by way of discharge pipe *n*. The sludge settles to the bottom of the tank and passes by way of pipe *f* into the intermediate pit or chamber *p*. Inasmuch as all of the ends of the siphon pipes dip below the surface of the liquid, no air can enter chamber *a* by way of said pipes, and inasmuch as the level of the sewage in chamber *o* is maintained higher than that of the liquid in chamber *e'* and the sludge and liquid in the intermediate chamber *p*, the siphonic action will continue uninterruptedly.

Should any air chance to enter the chamber *a* by way of any of the siphon pipes or in any unforeseen manner, it may be immediately expelled from the tank by opening the valve *h* in the combined air and grease pipe *f'*, closing the valve *k* at the end of pipe *e* and opening the valve in water supply pipe *d'*, so that the water passing backward into tank *a* through pipe *e* expels the air in said tank through the combined air and grease pipe *f'*. After the air has been thus expelled, the water supply from *d'* is shut off, valve *k* on the end of pipe *e* is opened and the siphonic action immediately resumed.

With an apparatus of the character hereinbefore described, the funnel *b* may be filled, when treating certain kinds of sewage, with pieces of coke of suitable size to further purify the water or liquid constituent of the sewage, and this coke may be effectively washed by means of water admitted through pipe *d*, discharge pipe *e* and funnel *b*, which provides an effective back wash to free the charcoal from any accumulation of dirt or sediment.

It will be understood, of course, that the pit for the solid material is in the first instance filled with water to a sufficient depth to seal the mouth of the discharge pipe *f*, and it is usually found convenient to raise the level of this water in the chamber *p* to the same height as the level of the water in chamber *e'*. Under these conditions, the higher level of the sewage in chamber *o* suffices to maintain the siphonic action and the sludge passes into chamber *p*, while the relatively clear and purified water passes into chamber *e'* and thence away by discharge pipe *n*. As the sludge accumulates in chamber *p*, the water above the same is displaced and may, of course, flow off by way of the discharge pipe as *x*.

What I claim is:

1. In apparatus for purifying and separating sewage the combination of a tank, a sewage inlet chamber, a sludge pit, a discharge chamber, an inlet pipe connecting the inlet chamber with the lower portion of the tank, a sludge pipe connecting the bottom of the tank with the sludge pit, a funnel arranged within the upper portion of the tank, a discharge pipe connecting said funnel with the discharge chamber and a combined air and grease discharge pipe within the tank connecting the space above the funnel with the discharge chamber as set forth.

2. In apparatus for purifying and separating sewage the combination of a tank, a sewage inlet chamber a sludge pit a discharge chamber an inlet pipe connecting the inlet chamber with the lower portion of the tank, a sludge pipe connecting the bottom of the tank with the sludge pit, a funnel arranged within the upper portion of the tank, a perforated cover for said funnel, a discharge pipe connecting said funnel with the discharge chamber and a combined air and grease discharge pipe within the tank connecting the space above the funnel with the discharge chamber as set forth.

3. In apparatus for purifying and separating sewage the combination of a tank a sewage inlet chamber a sludge pit, a discharge chamber an inlet pipe connecting the inlet chamber with the lower portion of the tank, a sludge pipe connecting the bottom of the tank with the sludge pit, a funnel arranged within the upper portion of the tank, a perforated cover for said funnel, a discharge pipe connecting said funnel with the discharge chamber, a combined air and grease discharge pipe within the tank connecting the space above the funnel with the discharge chamber and means for closing the lower ends of the inlet sludge and discharge pipes as set forth.

In testimony whereof I have affixed my signature, in presence of two witnesses.

ERICH MERTEN.

Witnesses:
HENRY HASPER,
WOLDEMAR HAUPT.